US008654784B2

(12) United States Patent
Starks et al.

(10) Patent No.: US 8,654,784 B2
(45) Date of Patent: Feb. 18, 2014

(54) MULTI-STAGE LARGE SEND OFFLOAD

(75) Inventors: John A. Starks, Seattle, WA (US); Keith L. Mange, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/722,434

(22) Filed: Mar. 11, 2010

(65) Prior Publication Data

US 2011/0222557 A1 Sep. 15, 2011

(51) Int. Cl.
*H04L 12/54* (2013.01)

(52) U.S. Cl.
USPC .......................................................... 370/464

(58) Field of Classification Search
USPC .................................................. 370/465–473
See application file for complete search history.

(56) References Cited

U.S. PATENT DOCUMENTS

| 6,707,796 | B1 | 3/2004 | Li |
| 7,181,542 | B2 | 2/2007 | Tuomenoksa et al. |
| 7,283,522 | B2 * | 10/2007 | Siddabathuni ................ 370/389 |
| 7,389,359 | B2 | 6/2008 | Jain et al. |
| 7,487,264 | B2 * | 2/2009 | Pandya .......................... 709/250 |
| 7,796,646 | B2 * | 9/2010 | Das et al. ....................... 370/474 |
| 7,864,806 | B2 * | 1/2011 | Qiu et al. ....................... 370/474 |
| 7,920,470 | B2 * | 4/2011 | Lindsay ......................... 370/230 |
| 7,944,946 | B2 * | 5/2011 | Zhou et al. .................... 370/474 |
| 2005/0147126 | A1 | 7/2005 | Qiu et al. |
| 2005/0223134 | A1 | 10/2005 | Vasudevan et al. |
| 2006/0072564 | A1 | 4/2006 | Cornett et al. |
| 2006/0104295 | A1 | 5/2006 | Worley et al. |
| 2008/0178201 | A1 * | 7/2008 | Billau et al. .................. 719/324 |
| 2009/0232137 | A1 * | 9/2009 | Cherian et al. ................ 370/392 |
| 2009/0323690 | A1 * | 12/2009 | Lu et al. ........................ 370/392 |

OTHER PUBLICATIONS

"High Reliable Capturing Crash Dumps for Linux", Mini Kernel Dump, www.mkdump.sourceforge.net, last updated Mar. 30, 2006.
Freimuth, D. et al., "Server Network Scalability and TCP Offload," 2005, 14 pages, downloaded at http://www.usenix.org/events/usenix05/tech/general/full_papers/freimuth/freimuth.pdf.
Masputra, A. et al., "An Efficient Networking Transmit Mechanism for Solaris: Multidata Transmit (MDT)," 2002, 12 pages, downloaded at http://arc.opensolaris.org/caselog/PSARC/2002/276/materials/mdt.pdf.
Senapathi, S. et al., "Introduction to TCP Offload Engines," Mar. 2004, 5 pages, downloaded at http://www.dell.com/downloads/global/power/1q04-her.pdf.
"Networking Adapter Performance Guidelines," Mar. 18, 2008, 6 pages, downloaded at http://blogs.technet.com/winserverperformance/archive/2008/03/18/networking-adapter-performance-guidelines.aspx.

* cited by examiner

*Primary Examiner* — Ricky Ngo
*Assistant Examiner* — Ben H Liu
(74) *Attorney, Agent, or Firm* — Tony Azure; Andrew Sanders; Micky Minhas

(57) ABSTRACT

A network stack sends very large packets with large segment offload (LSO) by performing multi-pass LSO. A first-stage LSO filter is inserted between the network stack and the physical NIC. The first-stage filter splits very large LSO packets into LSO packets that are small enough for the NIC. The NIC then performs a second pass of LSO by splitting these sub-packets into standard MTU-sized networking packets for transmission on the network.

20 Claims, 5 Drawing Sheets

MULTI-STAGE LARGE SEND OFFLOAD

BACKGROUND

When a guest computer system is emulated on a host computer system, the guest computer system is called a "virtual machine" as the guest computer system only exists in the host computer system as a software representation of the operation of one specific hardware configuration that may diverge from the native machine. The virtual machine presents to the software operating on the virtual machine an emulated hardware configuration.

A virtual machine management system (sometimes referred to as a virtual machine monitor or a hypervisor) is also often employed to manage one or more virtual machines so that multiple virtual machines can run on a single computing device concurrently. The virtual machine management system runs directly on the native hardware and virtualizes the resources of the machine by exposing interfaces to virtual machines for access to the underlying hardware. A host operating system and a virtual machine management system may run side-by-side on the same physical hardware. For purposes of clarity will we use the abbreviation VMM to refer to all incarnations of a virtual machine management system.

One problem that occurs in the operating system virtualization context relates to computing resources such as data storage devices, data input and output devices, networking devices etc. Because each of host computing device's multiple operating systems may have different functionality, there is a question as to which computing resources should be apportioned to which of the multiple operating systems. For example, a virtualized host computing device may include only a single network interface card (NIC) that enables the host computing device to communicate with other networked computers. This scenario raises the question of which of the multiple operating systems on the virtualized host should be permitted to interact with and control the NIC.

When one of the operating systems controls the NIC, the other operating systems sends it packets to the network through the operating system that controls the NIC. In such a case, the packet size accepted by the NIC may not be known. However, sending network TCP packets through a network stack is computationally expensive. Resources must be allocated for each packet, and each component in the networking stack typically examines each packet. This problem is compounded in a virtualization environment, because each packet is also transferred between the guest VM to the root operating system. This entails a fixed overhead per packet that can be quite large. On the other hand, the networking stack packet size is normally limited by the maximum transmission unit (MTU) size of the connection, e.g., 1500 bytes. It is not typically feasible to increase the MTU size since it is limited by network infrastructure.

Hardware NICs provide a feature called "Large Send Offload" (LSO) that allows larger TCP packets to travel through the stack all the way to the NIC. Since most of the cost per packet is fixed, this does a fairly good job, but NICs typically support packets that are fairly small, around 62 KB. There is a need for the transmission between operating systems of larger packets to reduce overhead.

SUMMARY

The embodiments described allow a network stack to send very large packets, larger than a physical NIC typically supports with large segment offload (LSO). In general, this is accomplished by performing multi-pass LSO. A first-stage LSO filter is inserted somewhere between the network stack and the physical NIC. The first-stage filter splits very large LSO packets into LSO packets that are small enough for the NIC. The NIC then performs a second pass of LSO by splitting these sub-packets into standard MTU-sized networking packets for transmission on the network.

To that end, a first operating system operating on a computing device receives an indicator of a first LSO packet size. The first LSO packet size is a multiple of a second LSO packet size that is supported by a network interface card connected to the computing device. The first operating system formats data (e.g., from an application) into a first packet of a first LSO packet size. The first packet is then transferred to a second operating system on the same computing device that has access to a network interface card. The first packet is then split on the second operating system into multiple LSO packets of a second LSO packet size that can be consumed by the network interface card. The multiple LSO packets are sent to the network interface card for transmission on the network in packets of a size supported by the network.

In general, the first operating system is executing on a virtual machine and the indicator of a first LSO packet size is received from a hypervisor operating on the same computing device. The virtual machine can be migrated to a second computing device and another indicator of a first LSO packet size is received from a hypervisor operating on the second computing device. The indicator of the first LSO packet size received from the hypervisor operating on the second computing device can different from the indicator of the first LSO packet size received from the hypervisor on the computing device. Consequently, the indicator of the first LSO size received from each of the hypervisor operating on the computing device and the hypervisor operating on the second computing device can be tuned for the specific computing device's CPU usage, throughput, latency or any combination thereof.

In general, the first packet has a TCP header. The packet header from the first packet is copied to the packets of second LSO-sized packets when they are split out.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different combinations similar to the ones described in this document, in conjunction with other present or future technologies.

Figure 1:
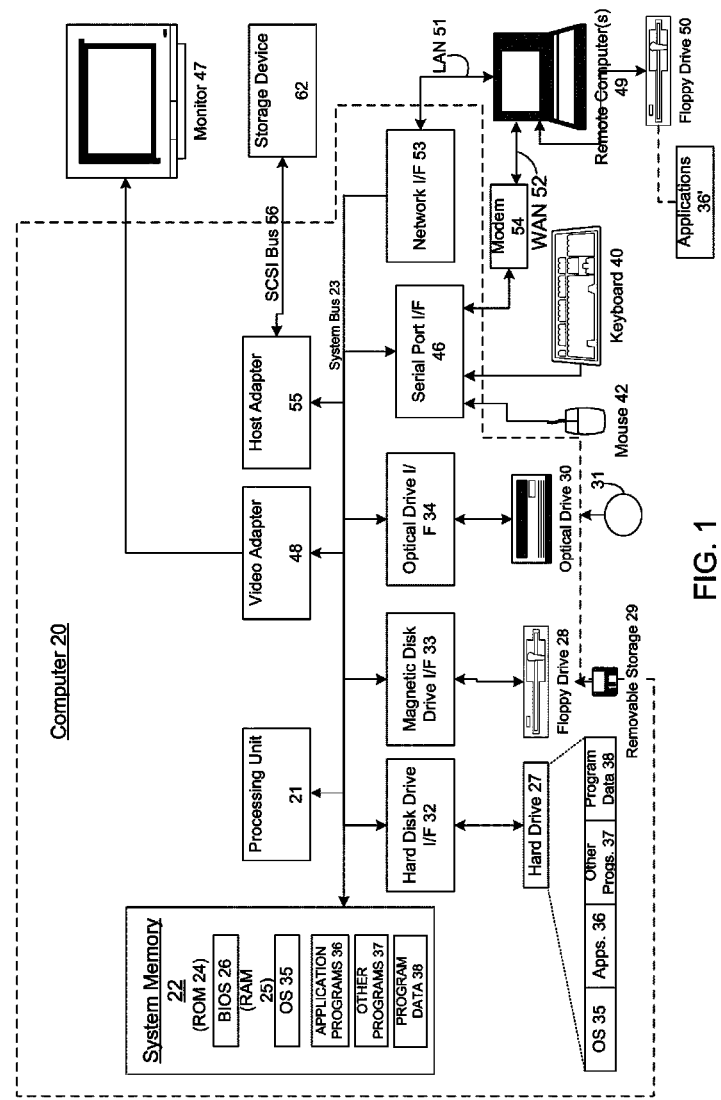
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computing device, such as a client workstation or a server. Generally, program modules include routines, programs, objects, components, data structures and the like that perform particular tasks. Those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Referring now to FIG. 1, an exemplary general purpose computing system is depicted. The general purpose computing system can include a conventional computer 20 or the like, including at least one processor or processing unit 21, a system memory 22, and a system bus 23 that communicative couples various system components including the system memory to the processing unit 21 when the system is in an operational state. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37 and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
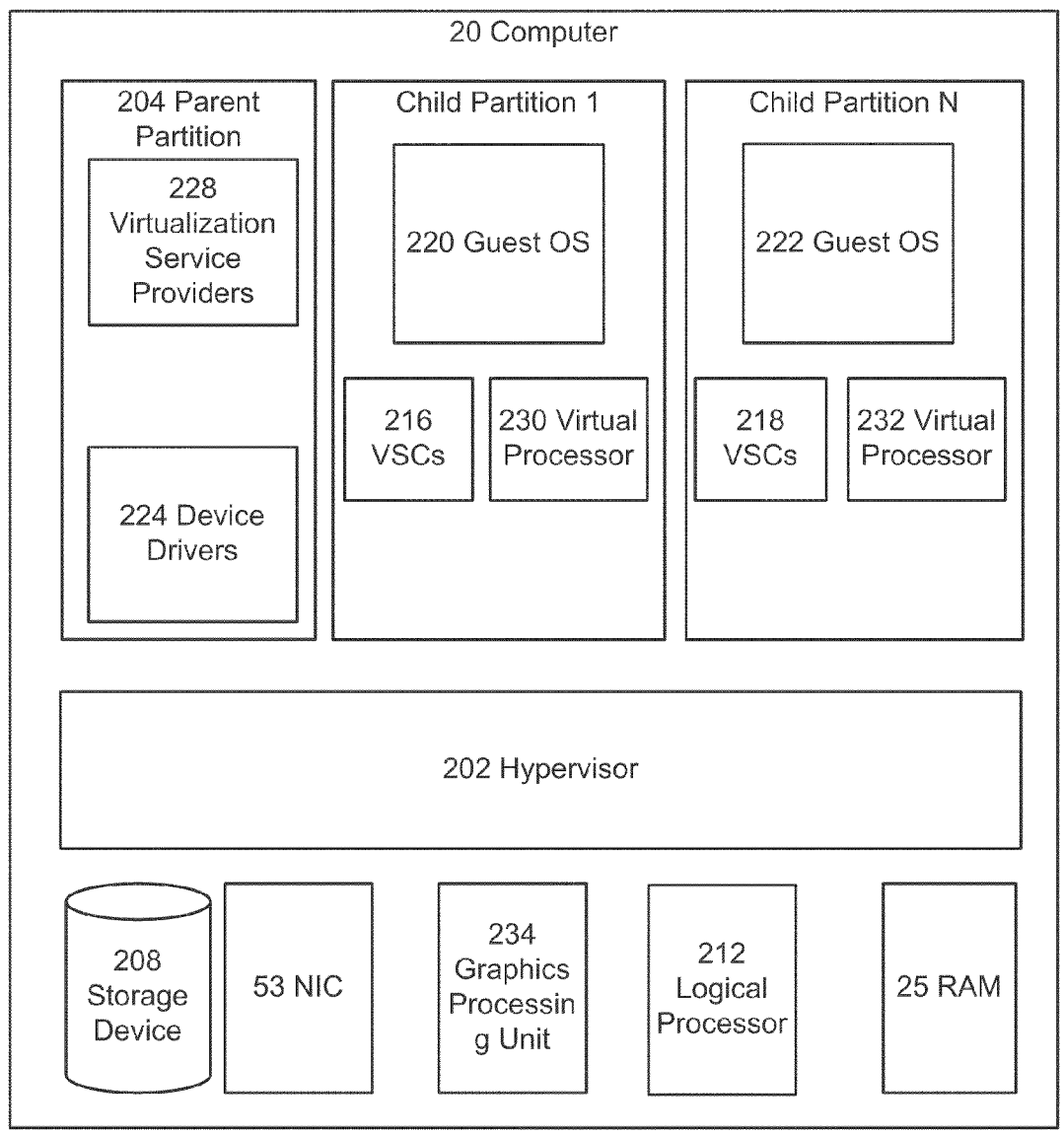
FIG. 2 illustrates a virtualized computing system environment.

Referring now to FIG. 2, it depicts a high level block diagram of computer systems that can be used in embodiments of the present disclosure. As shown by the figure, computer 20 (e.g., computer system described above) can include physical hardware devices such as a storage device 208, e.g., a hard drive (such as 27 in FIG. 1), a network interface controller (NIC) 53, a graphics processing unit 234 (such as would accompany video adapter 48 from FIG. 1), at least one logical processor 212 (e.g., processing unit 21 from FIG. 1), random access memory (RAM) 25. One skilled in the art can appreciate that while one logical processor is illustrated, in other embodiments computer 20 may have multiple logical processors, e.g., multiple execution cores per processor and/or multiple processors that could each have multiple execution cores. Depicted is a hypervisor 202 that may also be referred to in the art as a virtual machine monitor or more generally as a virtual machine manager. The hypervisor 202 in the depicted embodiment includes executable instructions for controlling and arbitrating access to the hardware of computer 20. Broadly, the hypervisor 202 can generate execution environments called partitions such as child partition 1 through child partition N (where N is an integer greater than 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition. In embodiments the hypervisor 202 can be a stand-alone software product, a part of an operating system, embedded within firmware of the motherboard, specialized integrated circuits, or a combination thereof.

In the depicted example configuration, the computer 20 includes a parent partition 204 that can be configured to provide resources to guest operating systems executing in the child partitions 1-N by using virtualization service providers 228 (VSPs). In this example architecture the parent partition 204 can gate access to the underlying hardware. Broadly, the VSPs 228 can be used to multiplex the interfaces to the hardware resources by way of virtualization service clients (VSCs). Each child partition can include a virtual processor such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, the combination of the virtual processors and various VSCs in a partition can be considered a virtual machine.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Each guest operating system 220 through 222 can have associated file systems that can have applications stored thereon such as e-commerce servers, email servers, etc., and the guest operating systems themselves. The guest operating systems 220-222 can schedule threads to execute on the virtual processors 230-232 and instances of such applications can be effectuated.

Figure 3:
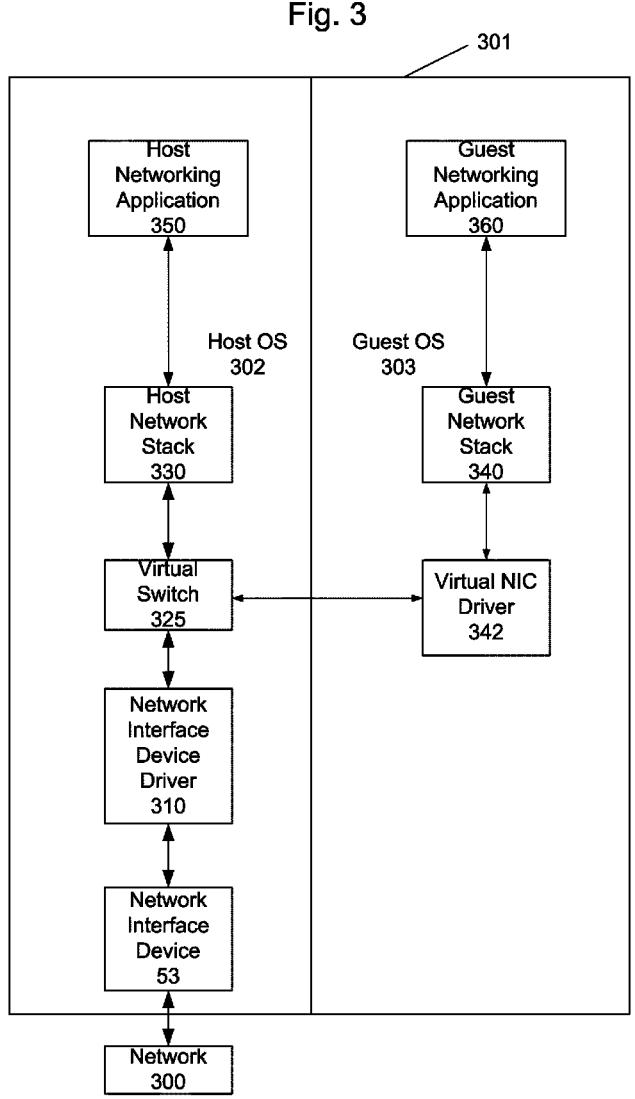
FIG. 3 illustrates the communication of networking across a virtualization boundary.

FIG. 3 is a block diagram representing an exemplary virtualized computing device where a first operating system (host OS 302) controls the Network Interface Device 53. Network Interface Device 53 provides access to network 300. Network interface device 53 may be, for example, a network interface card (NIC). Network interface device driver 310 provides code for accessing and controlling network interface device 53. Host network stack 330 and guest network stack 340 each provide one or more modules for processing outgoing data for transmission over network 300 and for processing incoming data that is received from network 300. Network stacks 330 and 340 may, for example, include modules for processing data in accordance with well known protocols such as Point to Point protocol (PPP), Transmission Control Protocol (TCP), and Internet Protocol (IP). Host networking application 350 and guest networking application 360 are applications executing on host operating system 204 and guest operating system 220, respectively, that access network 300.

As mentioned above, in conventional computing devices which adhere to the traditional virtualization boundary, data does not pass back and forth between virtualized operating systems. Thus, for example, in conventional configurations, when data is transferred between host networking application 350 and network 300, the data is passed directly from the host network stack 330 to the network interface device driver 310. However, in the system of FIG. 3, data does not pass directly from the host network stack 330 to the network interface device driver 310. Rather, the data is intercepted by virtual switch 325. Virtual switch 325 provides functionality according to an aspect of the invention.

Because the guest OS does not have direct access to the NIC, when the virtual NIC starts, the hypervisor advertises an LSO size to the networking stack indicating that the NIC is capable of LSO with a large packet size. LSO increases throughput by reducing the amount of processing that is necessary for smaller packet sizes. In general, large packets are given to the NIC and the NIC breaks the packets into smaller packet sizes in hardware, relieving the CPU of the work. For example, a 64 KB LSO is segmented into smaller segments and then sent out over the network through the NIC. By advertising an LSO packet size to the virtual NIC on the guest OS that is larger that the LSO-sized packets that are accepted by the NIC, the networking stack will pass much larger packets to the virtual NIC. The virtual NIC in turn will transfer the large packets to the virtual switch.

This causes the networking stack to format and send packets that are much larger than the MTU size supported by the underlying networking infrastructure, and much larger than the physical NIC that the virtual NIC is attached to supports. The packets are large chunks of data that are larger than a standard TCP packet, but with a TCP header. The precise LSO size is tuned to optimize for performance: CPU use, throughput, and latency, whereas previous solutions would choose the largest value expected to be supported by the underlying hardware NIC.

Normally this packet is sent all the way to the hardware as an LSO packet, or it is entirely split in software by a software LSO engine to MTU size. Instead, at some point before sending the packet to the hardware, it is split into multiple packets each with a maximum size no greater than that supported by the hardware's LSO engine, then send the new packets to the hardware NIC. This step can occur any time before the packet is sent to hardware, but the closer to the hardware that it is performed, the better the performance.

This is accomplished with an LSO algorithm, by copying the packet headers to each sub-packet and adjusting the TCP sequence number, identification field (for IPv4), and header flags. preferably, the IP or TCP checksums are not calculated as is normally required by LSO, because that will be performed by the hardware NIC. Similarly, the length field in the IP headers is not updated, nor is the TCP pseudo-checksum, as this would interfere with the NIC's later computation of these fields while performing hardware LSO.

Finally, the software LSO driver must wait to complete the full packet to the sender until all sub-packets have been sent by the NIC and are completed. This is achieved by keeping a count of outstanding sub-packets that have not yet completed, and completing the full packet when this count reaches zero.

Figure 4:
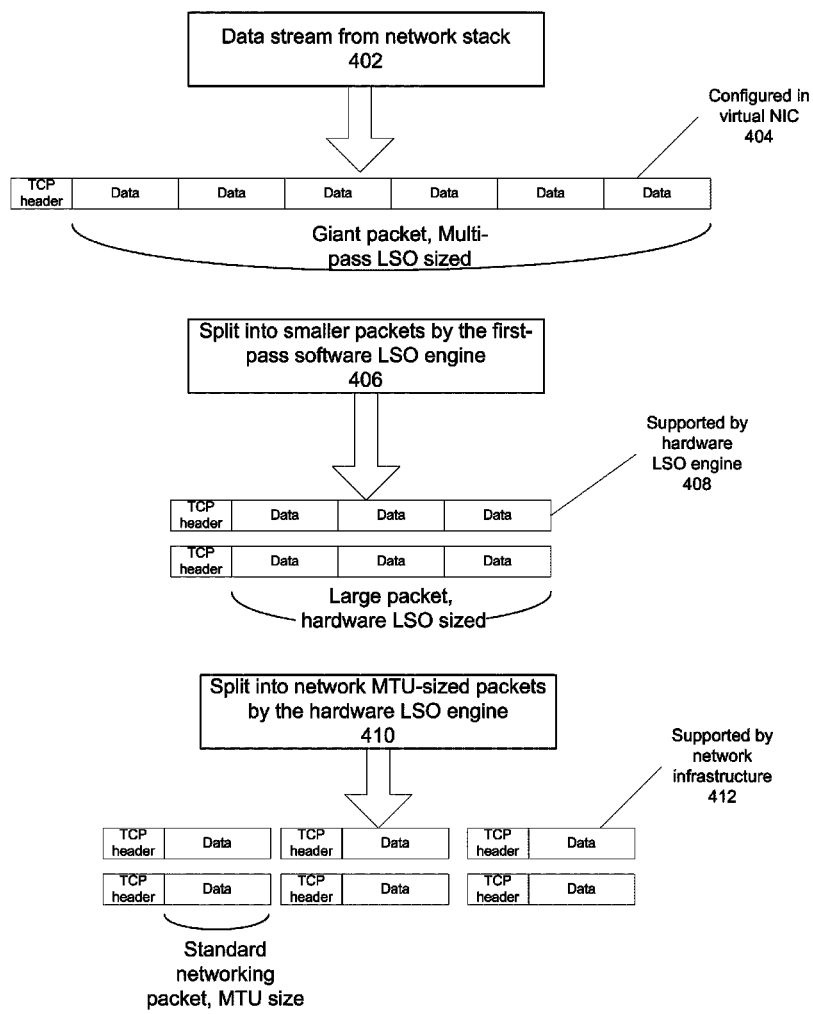
FIG. 4 is a flow diagram of the packet processing in accordance with an aspect of the invention.

FIG. 4 demonstrates in conjunction with FIG. 3 more detail the flow described above. In particular at 402, the data stream from the network stack 340 arrives at the virtual NIC driver 342. At 404, the virtual NIC driver 342 configures a packet that is as large as the hypervisor will allow. The LSO size of the packet is preferably much larger that the LSO packet size supported by NIC 53 in the host partition. The virtual NIC driver 342 then transfers the data to the virtual switch 325 by communication services provided by the hypervisor. At 406, the virtual switch 325 then splits the large format LSO into LSO packets that conform to the LSO packet size 408 supported by the NIC hardware 53.

At 410, the LSO engine of the NIC hardware 53 splits the LSO packets into MTU-sized packets 412 supported by the network infrastructure. Those packets are then transmitted over the network.

Figure 5:
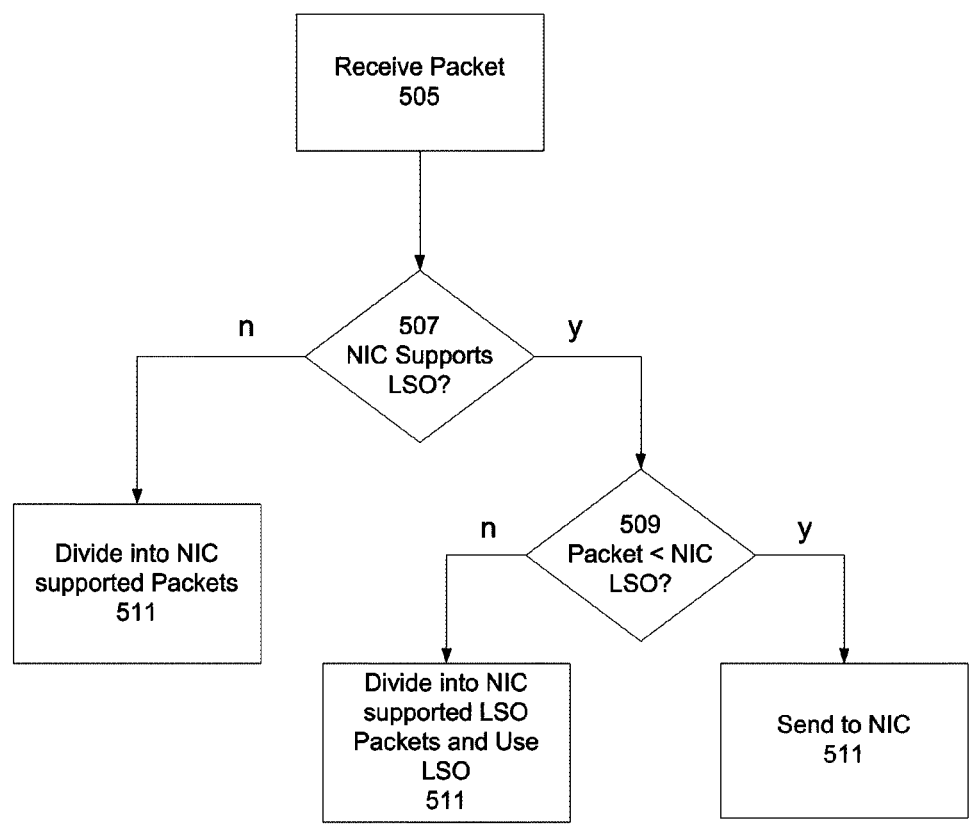
FIG. 5 is a flow diagram of the processing performed by the virtual switch according to an aspect of the invention.

FIG. 5 further illustrates the processing performed in virtual switch 325 of FIG. 3. At 505, virtual switch 325 receives the packet from virtual NIC driver 342. Thereafter at 507, virtual switch 325 determines if the NIC hardware 53 supports LSO. If LSO is supported, virtual switch 325 determines whether the packets is less than the NIC LSO packet supported. If yes, at 511, the packet is sent to the NIC hardware 53 without further processing. If no, at 511, the oversized LSO packet is subdivided into LSO supported packets. On the other hand, at 507, if NIC is not supported, then the packets are divided into NIC supported packets at 511.

The techniques described allow the virtual machine to be migrated from one system to another and maximize the performance on each system, preferably tailored to the NIC hardware on each system. To that end, when the virtual NIC driver loads on the target system, the hypervisor provides a LSO packet size that is then used to send the maximum sized packet to the partition that controls the NIC hardware. This allows an oversized packet to be determined for each system based on maximizing throughput or other parameters that may be desirable on the target system.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

Consequently, the network stack can send very large packets, larger than a physical NIC normally supports with LSO. This is accomplished by performing multi-pass LSO; a first-stage LSO switch is inserted somewhere between the network stack and the physical NIC that splits very large LSO packets into LSO packets that are small enough for the NIC. The NIC then performs a second pass of LSO by splitting these sub-packets into standard MTU-sized networking packets for transmission on the network.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for transmitting packets over a network, comprising:
   receiving at a first operating system operating on a computing device, an indicator of a first large segment offload (LSO) packet size wherein the first LSO packet size is a multiple of a second LSO packet size that is supported by a network interface card connected to the computing device;
   formatting data into a first packet of a first LSO packet size;
   transferring the first packet to a second operating system on the same computing device;
   splitting the first packet on the second operating system into multiple LSO packets of a second LSO packet size;
   sending the multiple LSO packets to the network interface card for splitting the LSO packets of a second LSO packet size into packets of a size supported by the network before transmission on the network.

2. The method as recited in claim 1 wherein the first operating system is executing on a virtual machine and wherein the indicator of a first LSO packet size is received from a hypervisor operating on the computing device.

3. The method as recited in claim 2 wherein the virtual machine is migrated to a second computing device and wherein the indicator of a first LSO packet size is received from a hypervisor operating on the second computing device and wherein the indicator of the first LSO packet size received from the hypervisor operating on the second computing device is different from the indicator of the first LSO packet size received from the hypervisor on the computing device.

4. The method of claim 3 wherein the indicator of the first LSO size received from each of the hypervisor operating on the computing device and the hypervisor operating on the second computing device is tuned for one of CPU usage, throughput and latency.

5. The method of claim 1 wherein the first packet has a TCP header.

6. The method of claim 5 wherein the splitting the first packet on the second operating system into multiple LSO packets of the second LSO packet size comprises copying the packet header from the first packet to the second LSO-sized packets.

7. The method as recited in claim 1 wherein a virtual NIC driver performs the formatting of the data into the first LSO packet size.

8. A computer-readable storage device having stored thereon computer-readable instructions that upon execution cause the transmitting packets over a network, the computer-readable instructions comprising instructions that upon execution cause:
    an indicator of a first large segment offload (LSO) packet size to be received at a guest operating system operating on a computing device, wherein the first LSO packet size is a multiple of a second LSO packet size that is supported by a network interface card connected to the computing device;
    data to be formatted into a first packet of the first LSO packet size;
    the first packet to be transferred to a host operating system on the same computing device;
    the first packet to be split on the host operating system into a plurality of LSO packets of a second LSO packet size;
    the plurality of LSO packets to be sent to the network interface card for splitting the LSO packets of a second LSO packet size into packets of a size supported by the network before transmission on the network.

9. The computer-readable device as recited in claim 8 wherein the guest operating system is executing on a virtual machine and wherein the indicator of a first LSO packet size is received from a hypervisor operating on the computing device.

10. The computer-readable device as recited in claim 9 wherein the virtual machine is migrated to a second computing device and wherein the indicator of a first LSO packet size is received from a hypervisor operating on the second computing device and wherein the indicator of the first LSO packet size received from the hypervisor operating on the second computing device is different from the indicator of the first LSO packet size received from the hypervisor on the computing device.

11. The computer-readable device of claim 10 wherein the indicator of a first LSO packet size received from each of the hypervisor operating on the computing device and the hyper-visor operating on the second computing device is tuned for one of CPU usage, throughput and latency.

12. The computer-readable device of claim 8 wherein the first packet has a TCP header.

13. The computer-readable device of claim 12 wherein the computer-readable instructions for causing the first packet to be split on the second operating system into a plurality of LSO packets of the second LSO packet size comprises copying the packet header from the first packet to the second LSO sized-packets.

14. The computer-readable device as recited in claim 8 wherein computer-readable instructions comprising a virtual NIC driver cause the data to be formatted into the first LSO-sized packet.

15. A system for transmitting packets over a network, comprising:
    a computing device comprising at least one processor;
    a memory communicatively coupled to said processor when said system is operational;
said memory having stored therein computer instructions that upon execution by the at least one processor cause:
    an indicator of a first large segment offload (LSO) packet size to be received at a guest operating system operating on a computing device, wherein the first LSO packet size is a multiple of a second LSO packet size that is supported by a network interface card connected to the computing device;
    data to be formatted into LSO packets of the first LSO packet size;
    the LSO packets to be transferred to a host operating system on the same system;
    the LSO packets to be split on the host operating system into multiple LSO packets of a second LSO packet size;
    the multiple LSO packets of the second LSO packet size to be sent to the network interface card for splitting the LSO packets of a second LSO packet size into packets of a size supported by the network before transmission on the network.

16. The system as recited in claim 15 wherein the memory has stored thereon instructions that instantiate a virtual machine when executed by the at least one processor, and wherein the guest operating system executes on the virtual machine and wherein the indicator of a first LSO packet size is received from a hypervisor operating instantiated on the system.

17. The system as recited in claim 16 wherein the virtual machine is migrated to a second computing device and wherein the indicator of a first LSO packet size is received from a hypervisor operating on the second computing device and wherein the indicator of the first LSO packet size received from the hypervisor operating on the second computing device is different from the indicator of the first LSO packet size received from the hypervisor on the computing device.

18. The system recited in claim 17 wherein the indicator of a first LSO packet size received from each of the hypervisor operating on the computing device and the hypervisor operating on the second computing device is tuned for one of CPU usage, throughput and latency.

19. The system as recited in claim 15 wherein the LSO packets of the first LSO size have a TCP header.

20. The system as recited in claim 19 wherein the instructions for causing the first packet to be split on the second operating system into multiple LSO packets of the second LSO packet size comprises copying the packet header from the first packet to the second LSO sized-packets.

* * * * *